United States Patent
Sawada

(10) Patent No.: US 7,050,185 B1
(45) Date of Patent: May 23, 2006

(54) IMAGE TRANSMITTING APPARATUS AND IMAGE RECEIVING APPARATUS

(75) Inventor: Toshihisa Sawada, Shiroi-machi (JP)

(73) Assignee: Panasonic Communication Co., Ltd., Fukuoka (JP)

(*) Notice: Subject to any disclaimer, the term of this patent is extended or adjusted under 35 U.S.C. 154(b) by 0 days.

(21) Appl. No.: 09/343,728

(22) Filed: Jun. 30, 1999

(30) Foreign Application Priority Data

Feb. 15, 1999 (JP) ................... 11-035889

(51) Int. Cl.
G06K 1/00 (2006.01)
H04N 1/00 (2006.01)
H04N 1/32 (2006.01)

(52) U.S. Cl. ............... 358/1.15; 358/434; 358/442; 358/468; 358/400; 358/436

(58) Field of Classification Search .......... 358/407, 358/434, 442, 468, 400, 436, 1.15
See application file for complete search history.

(56) References Cited

U.S. PATENT DOCUMENTS

| | | | |
|---|---|---|---|
| 5,675,507 A * | 10/1997 | Bobo, II .................. | 709/206 |
| 5,790,790 A | 8/1998 | Smith et al. | |
| 5,790,793 A | 8/1998 | Higley | |
| 5,881,233 A | 3/1999 | Toyoda et al. | |
| 5,991,514 A | 11/1999 | Nielsen | |
| 6,028,679 A * | 2/2000 | Murphy .................. | 358/407 |
| 6,124,939 A | 9/2000 | Toyoda et al. | |
| 6,167,469 A * | 12/2000 | Safai et al. .............. | 710/62 |
| 6,208,426 B1 * | 3/2001 | Saito et al. .............. | 358/1.15 |
| 6,211,972 B1 | 4/2001 | Okutomi et al. | |
| 6,229,884 B1 | 5/2001 | Toyoda et al. | |
| 6,240,445 B1 * | 5/2001 | Kumar et al. ............ | 709/206 |
| 6,463,462 B1 * | 10/2002 | Smith et al. ............. | 709/206 |
| 6,493,105 B1 | 12/2002 | Onuma | |
| 6,885,470 B1 | 4/2005 | Toyoda et al. | |
| 2002/0036792 A1 * | 3/2002 | Murphy .................. | 358/1.15 |
| 2002/0062363 A1 * | 5/2002 | Naylor et al. ............ | 709/223 |

FOREIGN PATENT DOCUMENTS

| | | | |
|---|---|---|---|
| CA | 2216419 | | 12/2001 |
| EP | 0 835 011 A1 * | | 4/1998 |
| JP | 6-387858 | | 4/1988 |
| JP | 10320534 | | 12/1988 |
| JP | 406141122 A * | | 5/1994 |
| JP | 9-231121 | | 9/1997 |
| JP | 09-231121 | * | 9/1997 |
| JP | 9-233243 | | 9/1997 |

(Continued)

OTHER PUBLICATIONS

English Language Abstract of JP 11-027418.

(Continued)

Primary Examiner—Edward Coles
Assistant Examiner—Houshang Safaipour
(74) Attorney, Agent, or Firm—Greenblum & Bernstein, P.L.C.

(57) ABSTRACT

IFAX reads an original using a scanner in accordance with a transmitting instruction by an operator. Next, IFAX generates a menu screen in an HTML, image data filed by unit of page is registered to a WWW server together with a generated HTML document. IFAX decides the WWW server based on a recipient's mail address. Next, IFAX sends notification of URL of a WWW server to a recipient to which image data should be transmitted. The recipient accesses to the WWW server based on URL, fetches image data by unit of page, and instructs printing selectively.

9 Claims, 13 Drawing Sheets

FOREIGN PATENT DOCUMENTS

| | | |
|---|---|---|
| JP | 1040187 | 2/1998 |
| JP | 10-107836 | 4/1998 |
| JP | 10-114126 | 5/1998 |
| JP | 10304127 | 11/1998 |
| JP | 10304128 | 11/1998 |
| JP | 10-327307 | 12/1998 |
| JP | 10-341304 | 12/1998 |
| JP | 11-027418 | 1/1999 |
| JP | 117405 | 1/1999 |
| JP | 20004252 | 1/2000 |
| JP | 200059417 | 2/2000 |
| WO | 98/23058 | 5/1998 |
| WO | 98/58335 | 12/1998 |

OTHER PUBLICATIONS

English Language Abstract of JP 10-114126.
An English Language abstract of JP 10-341304.
An English Language abstract of JP 10-327307.
English Language Abstract of JP 10-341304.
English Language Abstract of JP 10-327307.
English Language Abstract of JP 9-231121.
English Language Abstract of JP 9-233243.
English Language Abstract of JP 63-87858.

* cited by examiner

<E-MAIL ADDRESS/URL CORRESPONDING TABLE>

| E-MAIL ADDRESS | URL OF WWW SERVER |
|---|---|
| member*@ mgcs.co.jp | http://www.mem.mgcs.co.jp/ |
| *.mgcs.mei.co.jp | http://www.inner.mgcs.co.jp/ |
| *.mei.co.jp | http://www.inner.mei.co.jp/ |
| * | http://www.pub.mgcs.co.jp/ |

FIG. 3

<PAIR OF E-MAIL ADDRESS REGISTERED IN SINGLE BUTTON DIALING AND URL>

| SINGLE BUTTON DIALING | E-MAIL ADDRESS | URL OF WWW SERVER |
|---|---|---|
| F1 | a10@aaa.com | |
| F2 | b20@bbb.com | http://www.user.mgcs.co.jp/ |
| ⟨ | ⟨ | ⟨ |
| F99 | x90@xxx.com | http://www.mem.mgcs.co.jp/ |

FIG. 4

⟨TRANSMITTING DATA ATTRIBUTE TABLE⟩

CASE OF TRANSMITTING ONLY STANDARD DATA

| FILE ATTRIBUTE | MULTI-PAGE SIGN |
|---|---|
| .jpg | 0 |

FIG. 5A

CASE OF TRANSMITTING NON-STANDARD DATA

| FILE ATTRIBUTE | MULTI-PAGE SIGN |
|---|---|
| .jpg | 0 |
| .tif | 1 |
| .bmp | 0 |

FIG. 5B

⟨RECEPTION CAPABILITY TABLE⟩

| FILE ATTRIBUTE | MULTI-PAGE SIGN (1 IS MULTI-PAGE FILE) |
|---|---|
| .bmp | 0 |
| .tif | 1 |
| .jpg | 0 |

↑ HIGH PRIORITY

↓ LOW PRIORITY

FIG. 6

```
<HTML>
  <HEAD>
    <TITLE>faxmenu</TITLE>
  </HEAD>
  <BODY>
    </BODY>
</HTML>
```

FIG. 10

```
<HTML>
  <HEAD>
    <TITLE>faxmenu</TITLE>
  </HEAD>
  <BODY>
    <A HRFF="fax01.jpg">fax01.jpg</A><BR>
    <A HRFF="fax02.jpg">fax02.jpg</A><BR>
    <A HRFF="fax03.jpg">fax03.jpg</A><BR>
    <A HRFF="faxtiff.tif">faxtiff.tif</A><BR>
    <A HRFF="faxb01.bmp">faxb01.bmp</A><BR>
    <A HRFF="faxb02.bmp">faxb02.bmp</A><BR>
    <A HRFF="faxb03.bmp">faxb03.bmp</A><BR>
  </BODY>
</HTML>
```

FIG. 11

PRINT INSTRUCTION BUFFER

IMAGE TRANSMITTING APPARATUS AND IMAGE RECEIVING APPARATUS

BACKGROUND OF THE INVENTION

1. Field of the Invention

The present invention relates to an image transmitting apparatus for transmitting image data similar to a facsimile apparatus by use of an e-mail system, and relates to an image receiving apparatus for receiving the transmitted image data. The present invention relates particularly to the Internet facsimile apparatus wherein an image file is attached to an e-mail and transmission and reception are carried out on the Internet.

2. Description of the Related Art

The Internet facsimile apparatus (hereinafter referred to as IFAX) is conventionally known as a new facsimile image communication apparatus. IFAX converts image data of an original to a file of a TIFF format, attaches the image file to a mail main body as a form of an attached file, and transmits such an image file to an e-mail address for a recipient by use of the e-mail.

By the way, for directly transmitting a large amount of data such as a color image to a recipient's apparatus by the above IFAX, a large amount of memories is required in the recipient's apparatus. For this reason, in many cases, there are difficulties in transmitting the color image by use of the e-mail in actuality.

In order to deal with such difficulties, a new image communication system has been proposed. In this system, the e-mail having image data attached is not directly transmitted to the mail address of the recipient's apparatus. Instead of such a direct transmission, image data is registered to a WWW server placed on the network and a URL (Uniform Resource Locator) for accessing to the WWW server is transmitted to the recipient's apparatus. The above system can prevent an unexpected large amount of data from being directly sent to a mail box of a recipient's terminal.

However, in view of the usability, the registration of transmission data to the WWW server from IFAX and the transmission of URL to the recipient's terminal are not still good enough in the case of transmitting a large amount of data such as a color image.

In other words, even if image data is placed at the WWW server, the large amount of data must be fetched at one time when the recipient's apparatus fetches data. For this reason, the large amount of memories is required in the recipient's apparatus. Also, in the case of color printing the color image received from the WWW server, the entire received original is printed. For this reason, a lot of printing time is required, and its cost is increased. Moreover, even when an operator wishes to transmit and print an image with a higher quality than an image quality determined in a standard image data format, the image is always limited to a determined quality. Also, in a case where the operator wishes to change the WWW server where transmitting data is registered in accordance with the transmitting destination, such a case cannot be carried out.

SUMMARY OF THE INVENTION

An object of the present invention is to provide an image transmitting apparatus having a good usability wherein a recipient can fetch image data by unit of page and instruct printing selectively and no large amount of memory is required to the recipient.

The above object can be achieved by an image transmitting apparatus, which generates a menu screen in a markup language, registers image data filed by unit of page to a server together with a generated markup file, and sends notification of a server address to a recipient to which image data should be transmitted.

According to the present invention, when the recipient accesses to the server by use of the server address, downloads the menu screen, and clicks a file name described on the menu screen, reception by unit of one page is possible.

The above object can be achieved by an image transmitting apparatus comprising:

filing means for filing image data by unit of page:

registering means for registering a filed image file to a server apparatus: and informing means for transmitting an e-mail including a server address of the server apparatus to a recipient to which the image data should be transmitted.

The above object can be achieved by a server apparatus, which registers image files from the above image transmitting apparatus and selects a requested image file when an image receiving apparatus where an image is sent accesses thereto, and transfers the selected image file thereto.

The above object can be achieved by an image receiving apparatus comprising:

address extracting means for extracting a server address by use of an e-mail received from an image transmitting apparatus; and image obtaining means for obtaining an image file by unit of page by accessing to a server apparatus using the extracted server address.

The above object can be achieved by an image transmitting method comprising the steps of:

filing image data by unit of page:

generating a menu screen in which a file name of the image data is registered in a form of a structured document;

registering the filed imaged data and the menu screen to a server apparatus; and transmitting an e-mail including a server address of the server apparatus to a recipient to which image data should be transmitted.

The above object can be achieved by an image receiving method comprising the steps of:

receiving an e-mail including a server address to which image data to itself is registered;

extracting the server address from the received e-mail;

accessing to a server apparatus using the extracted server address so as to obtain a menu screen; and obtaining image data by unit of page using the menu screen.

BRIEF DESCRIPTION OF THE DRAWINGS

The above and other objects and features of the invention will appear more fully hereinafter from a consideration of the following description taken in connection with the accompanying drawing wherein alone example is illustrated by way of example, in which;

FIG. 3 is a structural view showing an e-mail address/ URL corresponding table according to the above embodiment;

FIG. 4 is a structural view showing a corresponding table showing an e-mail address/URL, which are registered in a single button dialing, according to the above embodiment;

FIGS. 5A and 5B are structural views showing a transmission data attribute table according to the above embodiment;

FIG. 6 is a structural view showing a reception capability table according to the above embodiment;

FIG. 10 is a view showing an original character string for a menu HTML according to the above embodiment;

FIG. 11 is a view showing a menu HTML generated according to the above embodiment;

DETAILED DESCRIPTION OF THE PREFERRED EMBODIMENTS

An embodiment of the present invention will now be described with reference to the accompanying drawings.

Figure 1:
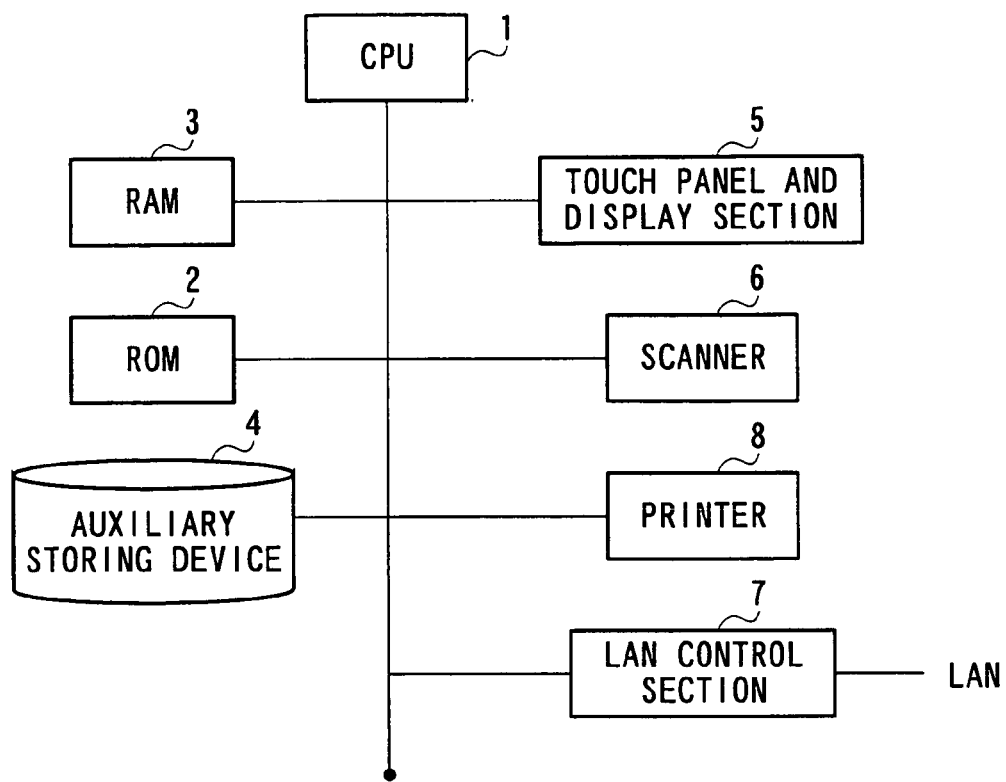
FIG. 1 is a functional block diagram of an Internet facsimile apparatus according to an embodiment of the present invention.

FIG. 1 is a hardware block diagram of a facsimile typed image communication apparatus (hereinafter referred to as "present apparatus") according to an embodiment of the present invention. In the present apparatus, CPU 1 controls the entirety of the apparatus. A ROM 2, a RAM 3, an auxiliary storing device 4, a touch panel and display section 5, a scanner 6, a LAN control section 7, and a printer 8 are connected to CPU 1 via an internal bus. ROM 2 stores a program, which is executed by CPU1, and RAM 3 is used as a program generating area or a storing area for temporarily storing mail data and image data. The auxiliary storing device 4 comprises a hard disk, and is used to store image data. The structure in which the auxiliary storing device 4 is reduced can be used by the simplification of transmitting and receiving processing. The touch panel and display section 5 functions as both a display section for displaying image data and an operation instruction guide and a touch panel for displaying an alphabet, a numeric figure, a mark, a one touch dial to input an operation instruction. The use of the touch panel and display section 5 allows displaying image data, instructing printing, and inputting an address. The scanner 6 scans an original and converts it to image data. In a case of a color original, the scanner 6 converts the color original to color image. The LAN control section 7 is a LAN interface that receives and transmits data through a network.

Figure 2:
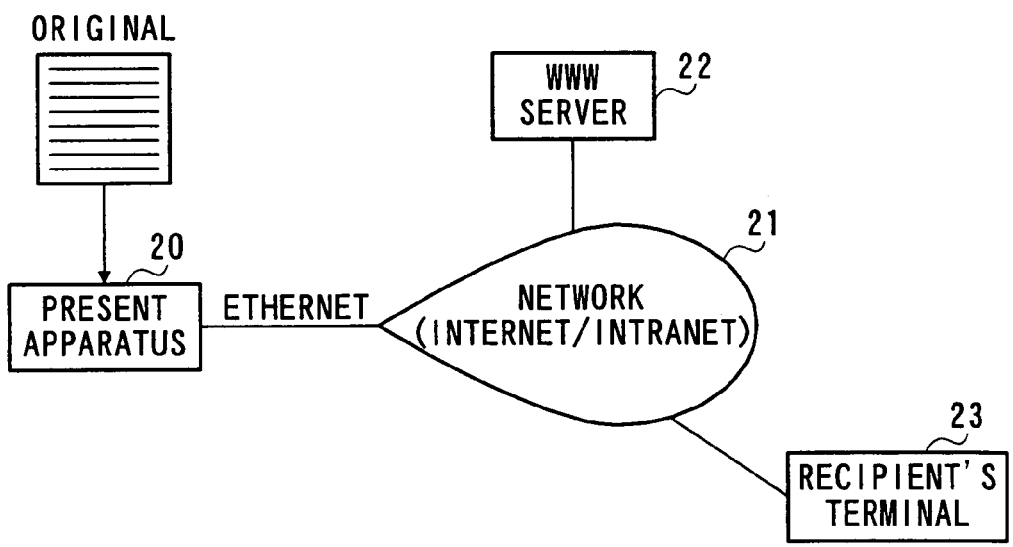
FIG. 2 is a network structural view having the present apparatus.

FIG. 2 is a network structural view having the present apparatus. A present apparatus 20 is connected to Ethernet. The present apparatus 20 is connected to a network 21 via Ethernet. The network 21 is the Internet or Intranet. The present apparatus 20 registers image data to a WWW server 22 provided in the network 21 on one hand and transmits URL for WWW server 22 to a recipient's terminal 23 positioned forward of the network 21 on the other hand.

The present apparatus 20 comprises a divisional registration function and a multiform registration function. The divisional registration function files image data of a plurality of pages by unit of page so as to be registered to WWW server 22. The multiform registration function registers transmitting image data to WWW server 22 in a plurality of data formats having a standard data format and a non-standard data format. The divisional registration function and the multiform registration function can be realized by executing the program stored in ROM 2 with the CPU 1.

Note that the embodiment of the present invention is explained on the assumption that data of an A4 size, 300 dpi, "YcdC" color space", and JFIF (JPEG File Interchange Format) is set in the standard data format, and other data is set in the non-standard data format.

The present apparatus 20 also comprises a server selection function for automatically changing a WWW server in accordance with a transmission destination. The selection of the server according to the transmission destination is carried out using the corresponding table in which an e-mail address and a URL of a WWW server are made to correspond to each other.

FIG. 3 shows the structural example showing an e-mail address/URL corresponding table registered in ROM 2 in association with the server selection function. In the corresponding table, a plurality of e-mail addresses for transmission destinations can be registered, URL addresses of WWW servers are registered in accordance with the respective e-mail data, and image data to be transmitted to the respective e-mail addresses are registered therein. Regarding the e-mail address, the complete address may be described or a part of the address (e.g., only domain) may be registered using a wild card (*). Also, one WWW server is registered an e-mail address (vacant address) using only a wild card. The reason is to select a WWW server having a default value when an e-mail address (entirety or part), which is not registered in the corresponding table, is input.

FIG. 4 is a corresponding table in which a WWW server can be selected when an e-mail address is input using a single button dialing. As shown in this figure, the single button dialing, the e-mail address and the URL of the WWW server to be used are made to correspond to each other.

FIGS. 5A and 5B show the structure of transmission data attribute tables registered in ROM 2 in association with the multiform registration function of the present apparatus. FIG. 5A is a table showing a case in which only standard data is sent, and FIG. 5B is a table showing a case in which non-standard data is sent together with standard data.

In a file attribute box of FIG. 5A, only ".jpg", which is standard data is registered. In a file attribute box of FIG. 5B, ".fif", ".bmp", are registered in addition to ".jpj", which is standard data. A file attribute=".tif" means a TIFF file, and a file attribute=".bmp" means a bit map file, and these files are dealt as non-standard.

Also, in the transmission data attribute table, a multi-page sign is added to each file attribute. A multi-page sign=1 is added to the file attribute (format) in which a plurality of pages are included in one file, and a multi-page sign=0 is added to the other file attributes (formats).

The present apparatus is used as a receiving apparatus when receiving image data from the WWW server. The recipient's terminal 23 of FIG. 2 can be formed to have the same structure as that of the present apparatus 20. In this case, a file selection obtaining function for selecting and obtaining a file suitable for an own processing capability is provided to the recipient's terminal 23.

FIG. 6 is a structural view of a reception capability table for providing the file selection obtaining function to the recipient's terminal 23. In the reception capability table, the own processing capability relating to the file attribute is registered. The file attributes are arranged in order of descending priorities when it is possible to handle a plurality of file attributes.

Figure 7:
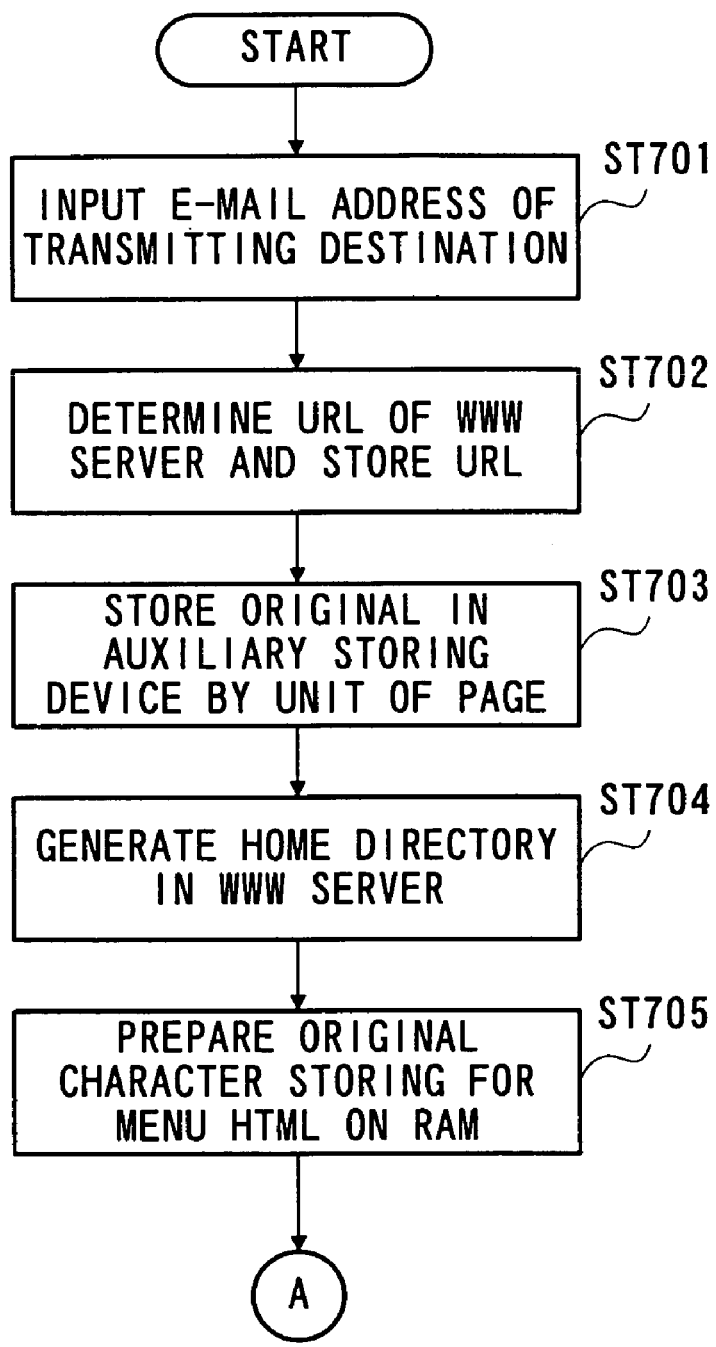
FIGS. 7 to 9 are flowcharts showing transmitting, operations according to the above embodiment.
Figure 8:
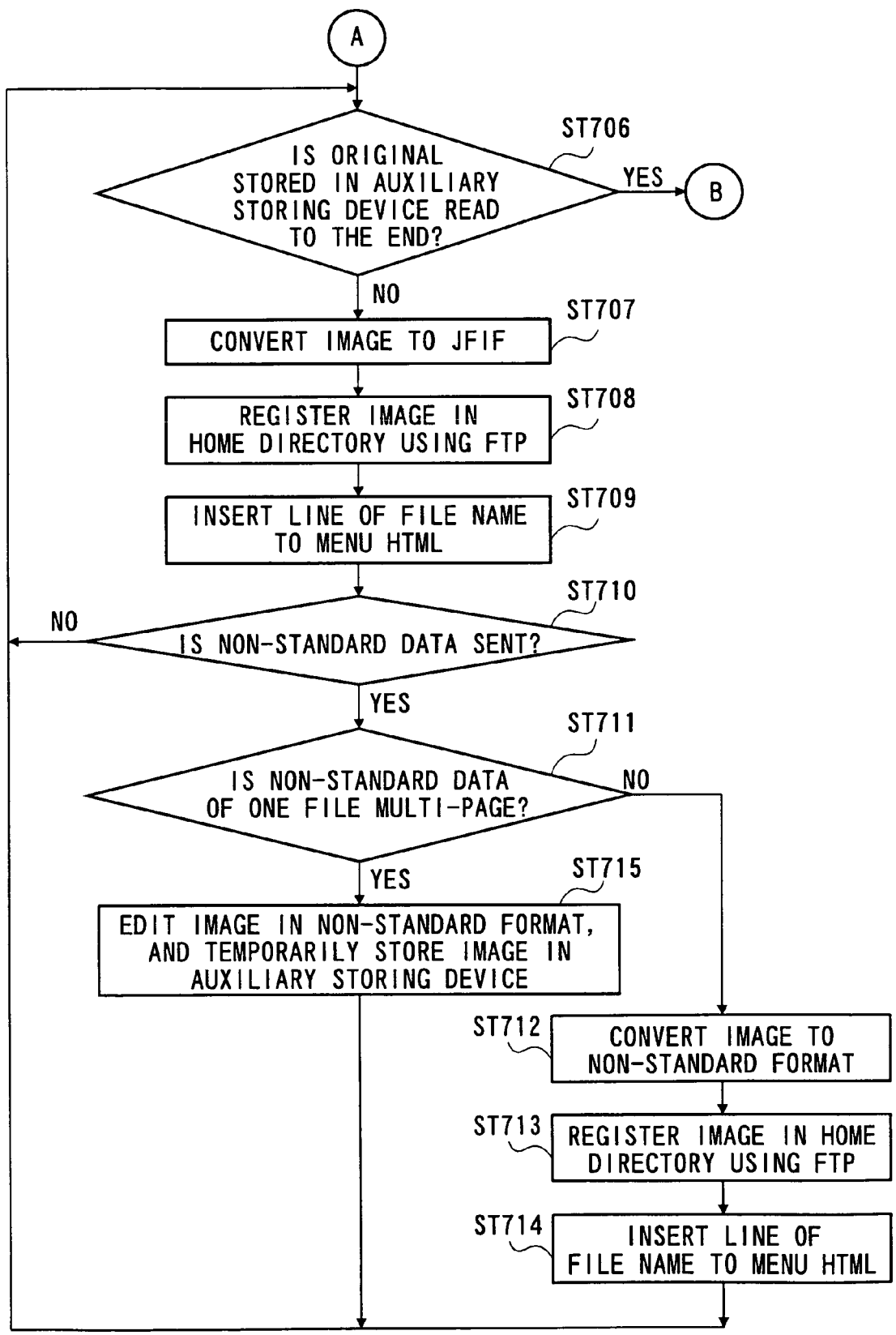
Figure 9:
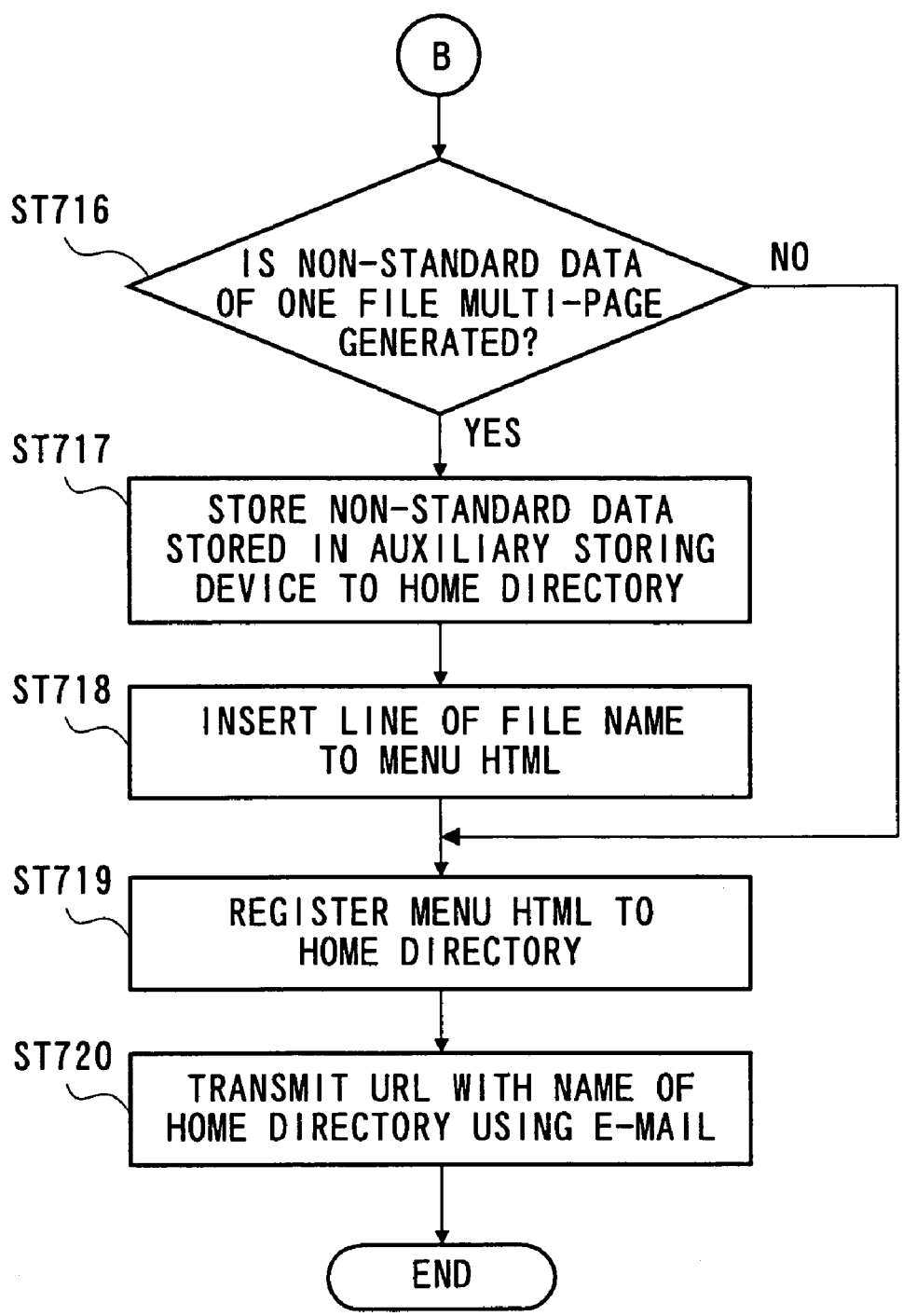

Next, an operation of the above-structured present apparatus will be explained. FIGS. 7 to 9 show flowcharts for the transmitting operation of the present apparatus 20. An e-mail address of the recipient terminal 23 is input from the touch panel and display section 5 (ST701). A mail address matching the input e-mail address is searched from the e-mail address/URL corresponding table shown in FIG. 3. As a result of the search, if a match exists, a URL of a WWW server corresponding to the e-mail address is determined, and the determined URL is stored in a predetermined area of RAM 3 (ST702).

Next, the scanner is operated in response to the operation input from the touch panel and display section 5. The scanner 6 scans an original and fetches image data. When a plurality of originals is set, the scanner 6 executes an original scanning operation and fetches image data for a plurality of pages (ST703). Image data fetched from the scanner 6 is filed by unit of page and a file name including a serial number such as "fax01", "fax02" is added for each page, and stored in the auxiliary storing device 4, sequentially (ST703). A page count is carried out at the same time when image data is stored to the auxiliary storing device 4 by unit of page.

Next, a home directory is generated in the WWW server (URL) selected in ST702 (ST704). The WWW server selected in ST702 is hereinafter the WWW server 22. More specifically, a subdirectory, having a name including an hour, a minute, a second in the server to be unique in the server, is generated using a FTP command under the directory preset for an FTP (File Transfer Protocol) registration in the WWW server 22. In this specification, this subdirectory is referred to as a home directory. The home directory is used to register the file (file by unit of page) stored in ST703.

Next, an original character string for an HTML (Hyper Text Markup Language) to be used as an original menu is prepared on RAM 3 (ST705). FIG. 10 shows an original character string for a menu HTML.

If an image data file stored in ST703 exists in the auxiliary storing device 4 (ST706), the image data file for an original stored in the auxiliary storing device 4 is read one page by one from "fax01". Then, the read image data file is converted to JFIT (ST707), and registered in the home directory of the WWW server 22 by the same file name using FTP (ST708). The line including the same file name as that registered in the home directory is inserted into the character string (portion of <BODY>) of the menu HTML prepared on RAM 3 (ST709). This HTML is regarded as a new HTML.

When the line of HTML having the file name registered in the home directory is inserted into the menu HTML, it is checked whether or not an instruction for transmitting non-standard data is set in the transmission data attribute table (ST710). If the instruction for transmitting non-standard data is not set therein, the operation goes back to step ST706 to determine whether or not the image data file is left. The processing from ST707 to 709 is repeated until processing of image data for all pages, which are stored in the auxiliary storing device 4, is ended.

While, if the instruction for transmitting non-standard data is set in ST710, determination as to whether or not data is non-standard data for one file multi-page is further carried out (ST711). This determination is carried out based on the multi-page sign set in the transmission data attribute table. If the multi-page sign=0 is set, image data is converted to a non-standard data format registered in the transmission data attribute table (ST712).

Then, image data converted to the non-standard format is registered in the home directory of the WWW server 22 using FTP (ST713). The line including the file name of image data registered in the home directory is inserted into the menu HTML (ST714).

Note that a plurality of pages must be converted to one file when the multi-page sign registered in the transmission data attribute table=0 is set. The image data file stored in the auxiliary storing device 4 corresponds to one page. The plurality of pages is read one page by one and edited in the non-standard format, with the result that the plurality of pages is converted to one file and temporarily stored in the auxiliary storing device 4 (ST715).

An example of a description of thus completed HTML is shown in FIG. 11. FIG. 11 is an example originals for three pages are described in the standard data format and two non-standard data formats (TIFF and bit map).

While, if it is determined that all files stored in the auxiliary storing device 4 have been stored in the home directory in ST706, it is determined whether or not non-standard data for one file multi-page is generated (ST716). If non-standard data for one file multi-page is generated and stored in the auxiliary storing device 4, the stored non-standard data is registered in the home directory of the WWW server 22 using FTP (ST717). The line including the file name of non-standard data registered in the home directory is inserted into the menu HTML on RAM 3 (ST718).

Next, a file name, that is, index.html is added to the home directory of the WWW server 22 and the menu HTML thus generated on RAM 3 is registered using FTP (ST719).

Then, a URL in which the name of the home directory is added at the back of the URL (URL of WWW server 22) stored in ST702 is generated (ST720). The generated URL is described in an External-Body Subtype field of an MIME header of the e-mail, and is transmitted to the recipient's terminal 23 by the e-mail.

Figure 12:
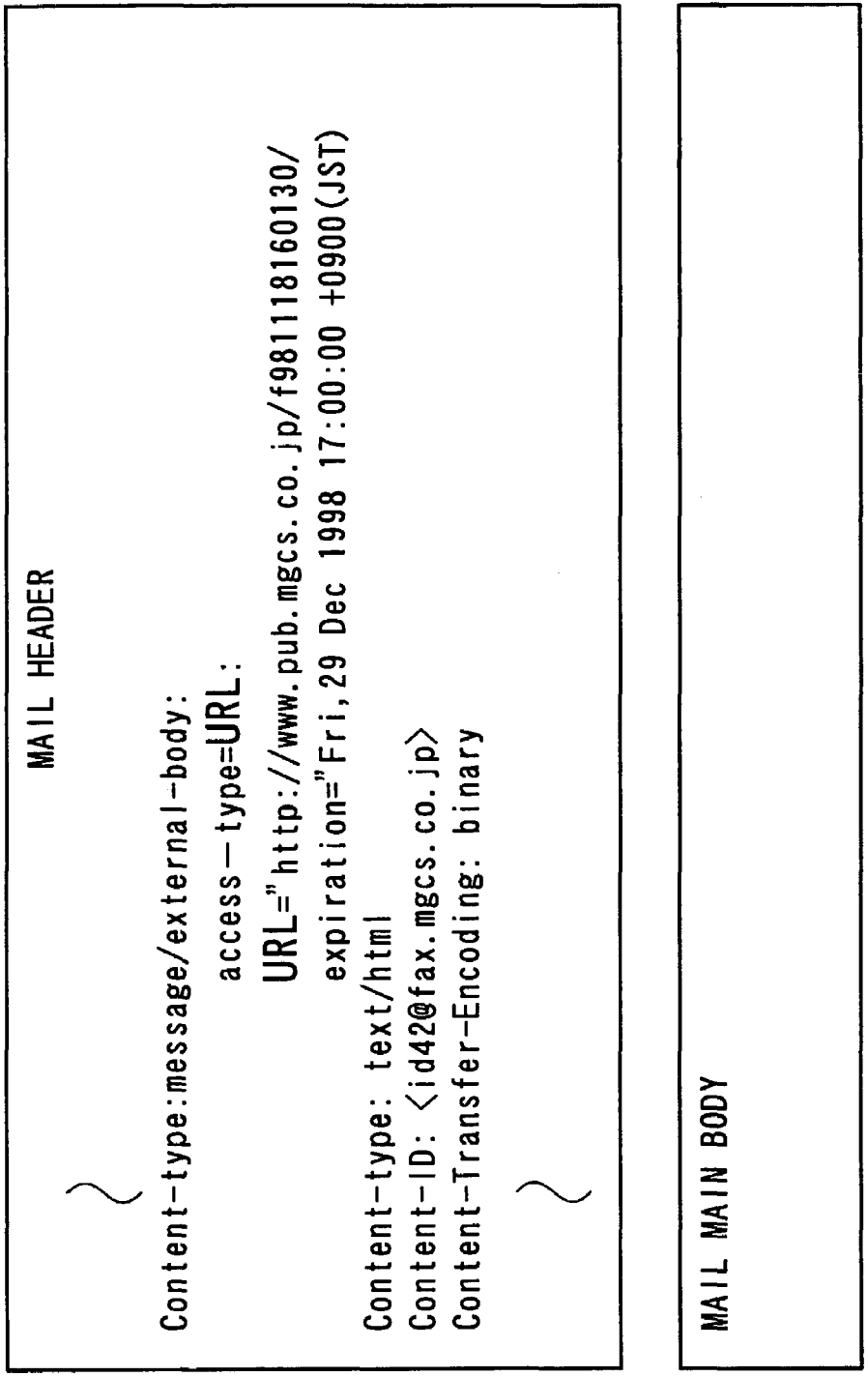
FIG. 12 is a mail header including URL generated according to the above embodiment.

FIG. 12 shows an example of the header of the e-mail including the above-mentioned URL. The URL may be described in a mail main body or a subject field.

In the example of the simple present apparatus that transmits only the image file in the standard data format, every time when an image file for one page is generated, the corresponding image file may be sequentially registered in the server. Namely, a series of processing, which includes the reading the file for one page, the JFIF conversion, and the registration to the WWW server, is repeated through all pages. This eliminates the need for reading all pages at one time, and reduces the capacity of the auxiliary storing device 4.

Figure 13:
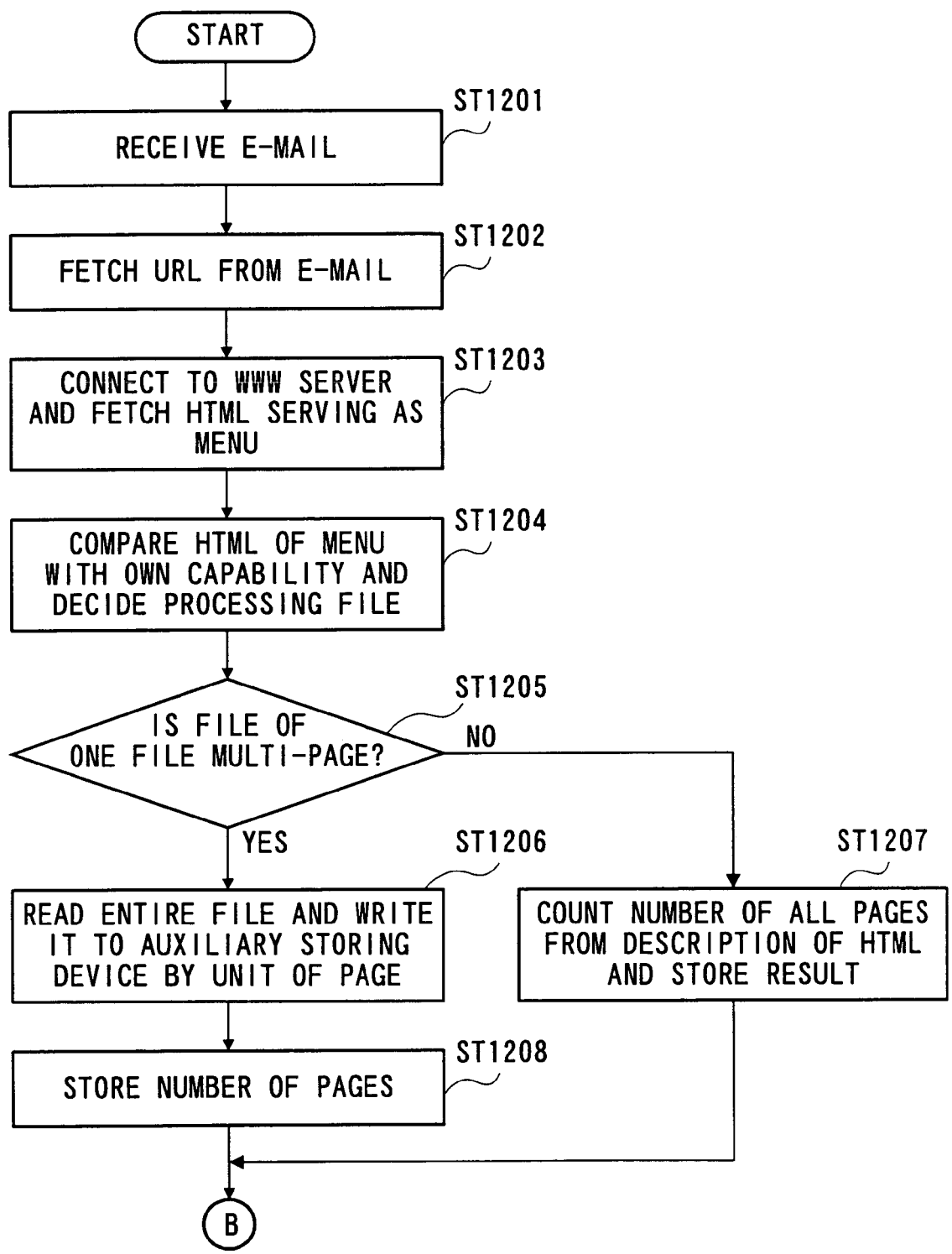
FIG. 13 is a flowchart showing the first half of the receiving operation according to the above embodiment.
Figure 14:
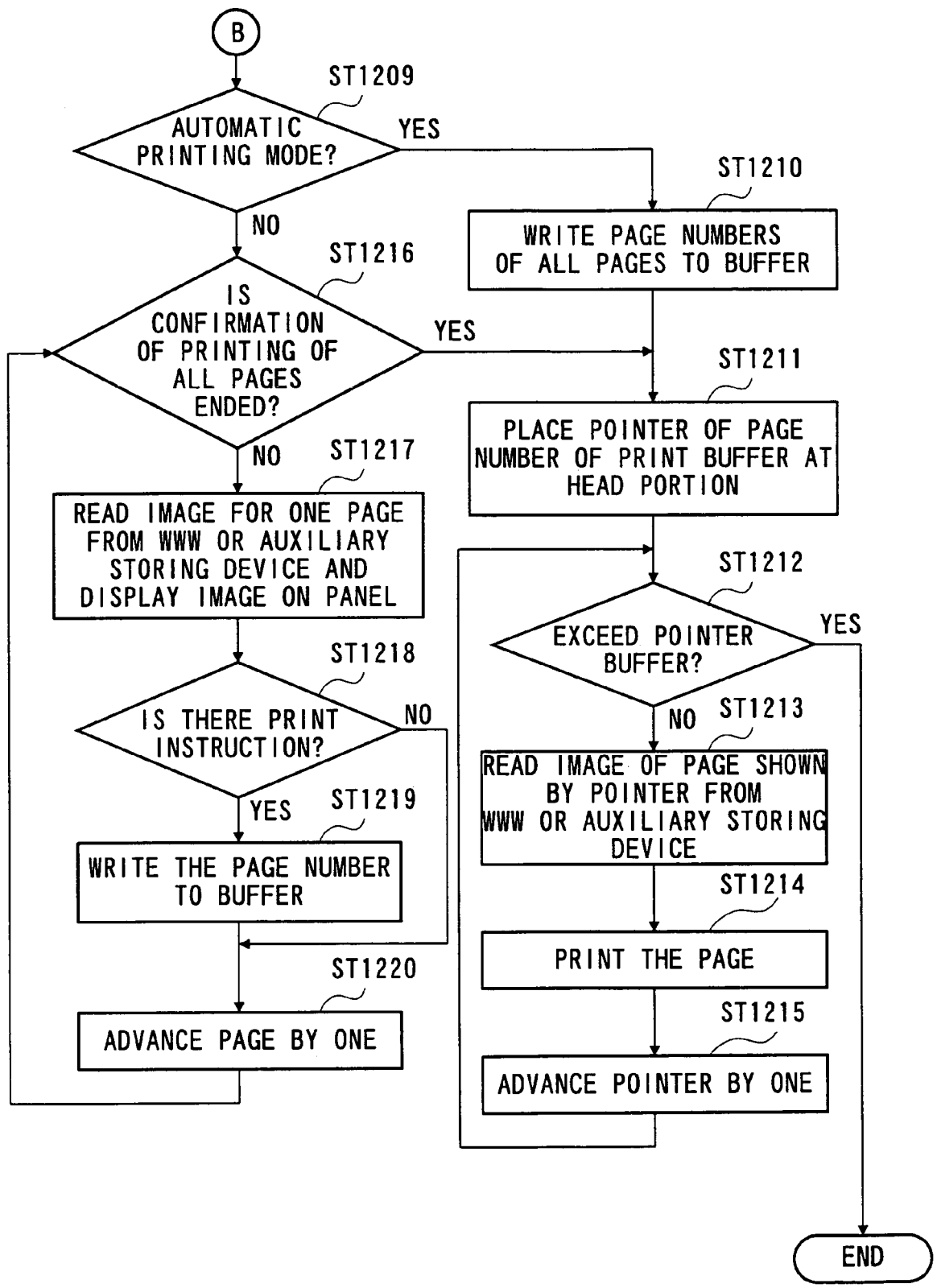
FIG. 14 is a flowchart showing the second half of the receiving operation according to the above embodiment.

Next, a receiving operation in which the recipient's terminal 23 fetches the registered image file from the WWW server 22 will be explained with reference to the flowcharts of FIGS. 13 and 14. As mentioned above, the present apparatus 20 transmits the URL of the WWW server 22 to the mail address of the recipient's terminal 23 by use of the e-mail.

When the recipient's terminal 23 receives the e-mail including the URL of the WWW server 22 (ST1201), the recipient's terminal 23 fetches the URL from the mail header (MIME header) of the e-mail (ST1202). Then, the recipient's terminal 23 accesses to the WWW server 22, which the URL shows, using HTTP, and fetches a menu HTML from the WWW server 22 (ST1203).

Next, the recipient's terminal 23 selects a file attribute suitable for the own capability from the file attributes registered in the menu HTML (ST1204). For this reason, the recipient's terminal 23 fetches the file attribute in order of descending priorities, and compares the fetched file attribute with the file attribute in the line where the file name of the menu HTML is described. If there is a file matching a file attribute having the highest priority in the menu HTML, the file name of the file attribute is decided as a file to be received. While, if there is no file matching the file attribute having the highest priority in the menu HTML, the recipient's terminal 23 fetches a file attribute having the next highest priority in the reception capability table and carries out the similar checking. The recipient's terminal 23 fetches the file attribute from the reception capability table as lowering the priority sequentially until a matching file attribute is found, and executes the similar checking.

If the attribute of the file name thus decided is a file such as ".TIF" that includes a plurality of pages in one file, the recipient's terminal 23 reads the entirety of the file from the WWW server 22, converts the file in a format in which the file can be read by unit of page, and writes the converted file into the own auxiliary storing device (ST1206). At this time, the recipient's terminal 23 counts the number of all pages of the file, and stores the number of counted pages (ST1208). Also, if the file is not one that includes a plurality of pages in one file, the recipient's terminal 23 counts the number of all pages from the description of the menu HTML, and stores the number of counted pages (ST1207).

Figure 15:
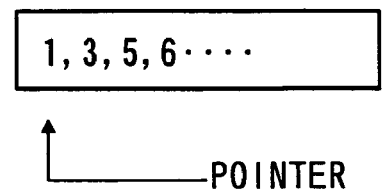
FIG. 15 is a view showing a print instruction buffer according to the above embodiment.

Next, the recipient's terminal 23 determines whether or not an automatic printing mode is designated (ST1209). If the automatic printing mode is designated, the page numbers of all pages are written into a print instruction buffer (ST1210). An example of the print instruction buffer is shown in FIG. 15. The page numbers of all pages are written at one time.

First of all, a pointer for a page number of the print instruction buffer is placed at the head portion (ST1211). It is confirmed that the pointer does not exceed the print instruction buffer (ST1212). Image data of the page shown by the pointer is read from the WWW server 22 or the own auxiliary storing device (ST1213). The read page is printed (ST1214). The pointer of the print instruction buffer is advanced by one (ST1215). Similarly, print processing for image data of a next page is carried out. This print processing is repeated until the pointer exceeds the print instruction buffer.

Figure 16:
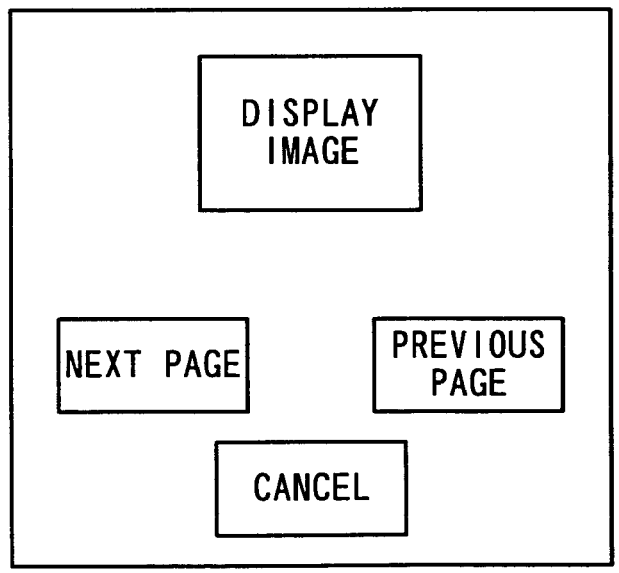
FIG. 16 is a conceptual view showing a touch panel and display section according to the above embodiment.

If it is determined that the automatic printing mode is not designated in ST1209, a selection of a page number, which can enter the print instruction buffer, is instructed. It is assumed that the recipient's terminal 23 comprises the touch panel and display section as shown in FIG. 16. The recipient's terminal 23 reads image data one page by one in order of pages from the WWW server 22 or the own auxiliary storing device in accordance with the operation using the touch panel and display section. Then, image data is displayed on the panel of the touch panel and display section (ST1217). An operator selects the presence or absence of print by unit of page. The recipient's terminal 23 waits for a print instruction in a state that image data for one page is displayed on the panel (ST1218). If the print instruction is input by the operator, the page number is written in the print instruction buffer (ST1219). Then, a next page button of the touch panel and display section is depressed, and the recipient's terminal 23 advances the page by one (ST1220). While, if the print instruction is not input, the recipient's terminal 23 advances the page by one as it is (ST1220). In the case of the touch panel and display section, if the operator depresses the range where the image is displayed with a finger, the recipient's terminal 23 determines it as a print instruction, and displays an outer frame.

Figure 17:
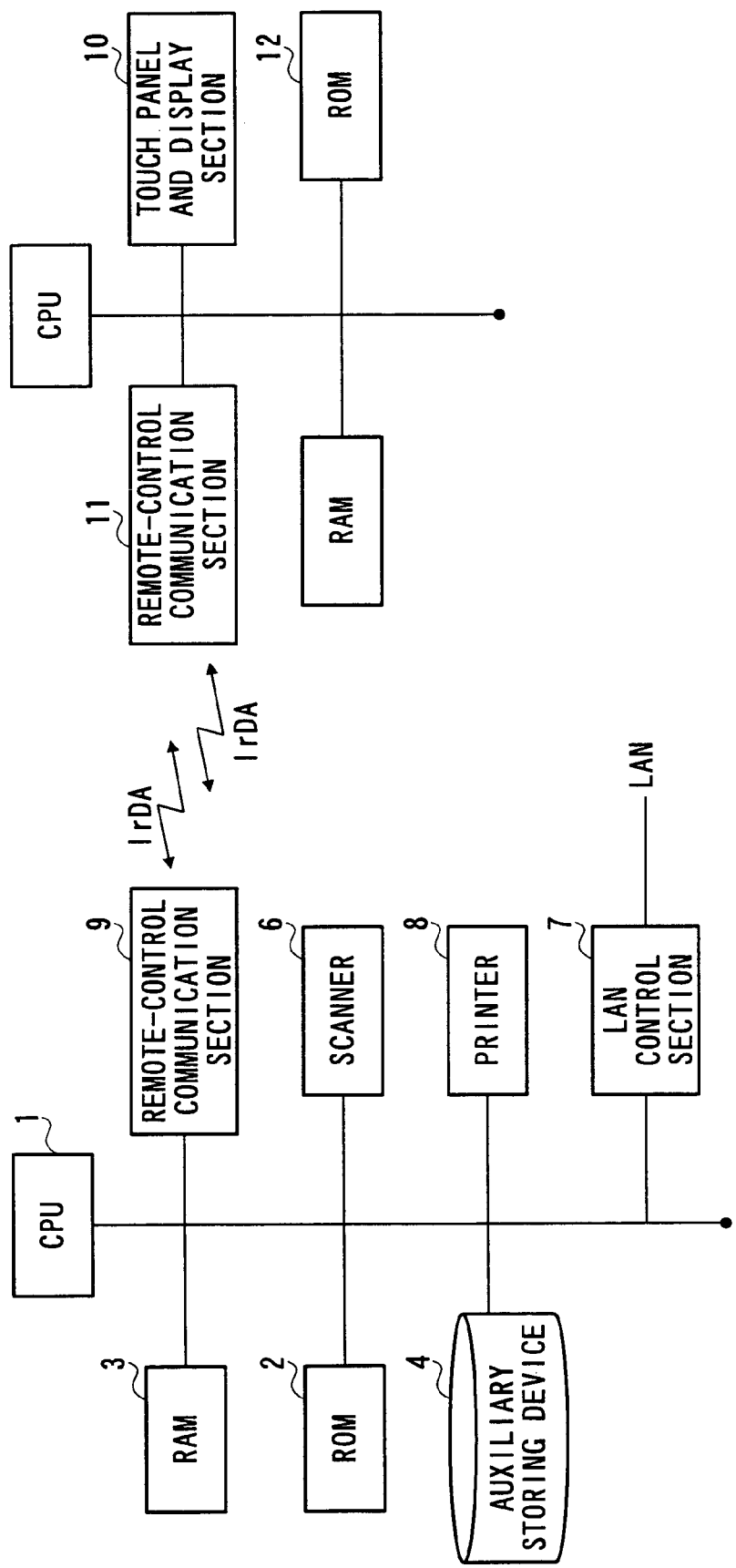
FIG. 17 is a functional block diagram showing a recipient's terminal according to the above embodiment.

An example of the structure of the recipient's terminal is shown in FIG. 17. According to this embodiment, a terminal, which receives image data from the WWW server, is referred to as a recipient's apparatus, and may have the same structure as that of the present apparatus 20. The recipient's terminal shown in this drawing has the same functions as those of the present apparatus 20. Moreover, the touch panel and display section is a remote-control type, which is separated from the main body of the apparatus. The main body side has a remote-control communication section 9, and a remote-control side has a touch panel and display section 10 and a remote-control communication section 11.

According to the above-mentioned embodiment, image data filed by unit of page is registered to the WWW server 22, and the URL for obtaining access to the WWW server 22 is transmitted to the mail address of the recipient's terminal 23. As a result, at the time when the receiver side processes image data on the WWW server, the receiver side can receive image by unit of page, and an auxiliary storing device for the entire pages need not be provided.

Further, according to the embodiment of the present invention, image data to be transmitted is registered to the WWW server 22 in the plurality of data formats including the standard data format and the non-standard data format. Then, the URL for obtaining access to the WWW server 22 is transmitted to the mail address of the recipient's terminal 23. As a result, it is possible to transmit image data by one reading processing such that full use can be made of recipient's capability in either case that the recipient's terminal is the simple apparatus which supports only the standard data format or supports non-standard data format of high quality.

Also, according to the embodiment of the present invention, the corresponding table in which the recipient's e-mail address and the server address to which the image registration should be provided are made to correspond to each other is prepared so that the server can be automatically selected. In accordance with the recipient, the WWW server can be selected without making the operation content complicated. For example, a WWW server for many users like a bulletin board and a WWW server for limited members can be used in accordance with the recipient.

The present invention is not limited to the above embodiment. For example, in the aforementioned embodiment, the image was transferred and registered to the WWW server of the URL registered in the corresponding table shown in FIG. 3 based on the e-mail address. However, regarding a specific e-mail, the image is attached to the e-mail and transmitted to the recipient's terminal without registering the image to the WWW server. Also, the transmission to the recipient's terminal by use of the e-mail may be set to a default value.

Figure 18:
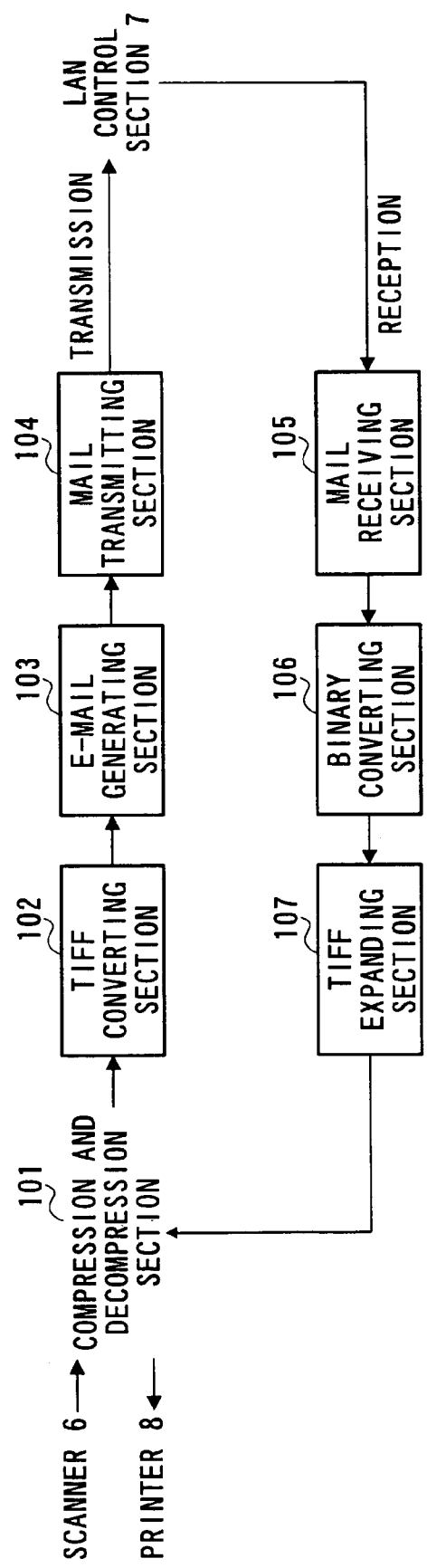
FIG. 18 is a block diagram showing the function of the e-mail transmission of an Internet facsimile apparatus according to the other embodiment of the present invention.

Namely, the present apparatus may use both the image transmission via the WWW server and the image transmission by use of the e-mail. FIG. 18 is a block diagram showing the function of the e-mail transmission of an Internet facsimile apparatus according to the other embodiment of the present invention. The present apparatus has the same structure as that of IFAX according to the aforementioned embodiment shown in FIG. 1. In the present apparatus, at the transmission time, first of all, a compression and decompression 101 compresses a raw image scanned by a scanner 6 to compressed data at a transmission time. Next, a TIFF converting section 102 converts compressed data to a TIFF file. A plurality of compressed data is stored in the TIFF file such that one compressed data is stored with respect to one page of an original. A destination's address of an e-mail to be transmitted is sent to an e-mail generating section 103 in accordance with an input from the touch panel and display section 5. Then, the e-mail generating section 103 generates an e-mail including the TIFF file as an attached file. In other words, the TIFF file is text coded, and the text-coded TIFF file is attached to a mail data section, which is defined by, for example, MIME (Multipurpose Internet Mail Extensions). Thereafter, a mail transmitting section 104 transmits the e-mail to the mail server via the LAN control section 7.

On the other hand, a mail receiving section 105 receives the e-mail from the mail server at a receiving time. A binary converting section 106 binary converts the data section of the received e-mail from the text code to the TIFF file. Thereafter, a TIFF expanding section 107 expands the TIFF file. Next, the compression and decompression 101 decompresses compressed data so as to be sent to a print section 8. The print section 8 prints out an image.

Thus, according to the other embodiment, it is possible to select either the image transmission using the WWW server or the image transmission by use of the e-mail in accordance with the recipient's terminal.

Further, in the aforementioned embodiment, the facsimile apparatus was explained as a communication terminal. However, the scope of the present invention includes the other image communication apparatus. For example, the present invention includes a PC to which a LAN card or a modem is connected in order to make connection with the Internet. The scanner or the printer can be connected to the PC through an external section I/F. The present invention also includes a network scanner having a network communication interface, and a network copy machine. Moreover, the present invention includes an image combination machine comprising a scanner, a printer, a copy machine, a facsimile apparatus, etc.

Furthermore, the present invention includes a computer-readable storage medium having a program code causing a computer to execute the same processing as that of the facsimile apparatus according to the aforementioned embodiment.

The present invention is not limited to the above described embodiments, and various variations and modifications may be possible without departing from the scope of the present invention.

This application is based on the Japanese Patent Application No. HEI11-35889 filed on Feb. 15, 1999, entire content of which is expressly incorporated by reference herein.

What is claimed is:

1. An image data transmitting apparatus comprising:
    a controller configured to convert image data into a predetermined plurality of file formats, the data of each file format including all of the image data;
    a memory configured to store an e-mail address of a recipient and an address of a server corresponding to the e-mail address of the recipient;
    a transmitter configured to determine the server corresponding to the recipient when the e-mail address of the recipient is input, to transmit to said server the data in each of the predetermined plurality of file formats and to transmit to the recipient, by e-mail, the address of the server in which the data in the predetermined plurality of file formats corresponding to the image data is stored, whereby the recipient can access the server by using said address and select, from the server, image data that is stored in a file format corresponding to the capability of the recipient.

2. The image transmitting apparatus according to claim 1, wherein the plurality type of file formats comprise a JPEG file, a tiff file or a bit map file.

3. The image transmitting apparatus according to claim 1, wherein a file converter coverts image data in units of a page.

4. An image receiving apparatus connected to an image transmitting apparatus through a network including at least one server, the server configured to store image data to be received in a predetermined plurality of file formats, data of each file format including all of the of the image data, the image receiving apparatus comprising:
    a receiver configured to receive an e-mail with an address of a server in which the image data to be received is stored;
    an extractor configured to access the server by using said address, to select image data that is stored in a file format corresponding to the capability of the image receiving apparatus, and to extract the image data of said selected file format from said server.

5. The image receiving apparatus according to claim 4, wherein image data is converted in units of a page and can be extracted from the server in units of a page.

6. An image transmitting method using a memory configured to store an e-mail address of a recipient and an address of a server corresponding to the e-mail address of the recipient, the method comprising:
    converting image data into data in a predetermined plurality of file formats, the data of each file format including all of image data;
    determining the server corresponding to the recipient when an e-mail address of the recipient is input;
    transmitting to the server the data in each of the predetermined plurality of file formats and transmitting to said recipient, by e-mail, the address of the server in which the data in the predetermined plurality of file formats corresponding to the image data is stored, whereby the recipient can access the server by using the address and select, from the server, image data that is stored in a file format corresponding to the capability of the recipient.

7. An image receiving method for receiving image data through a network including at least one server, the server configured to store image data to be received by an image receiving apparatus in a predetermined plurality of file formats, the method comprising:
    receiving an e-mail with an address of a server in which the image data to be received is stored;
    accessing the server by using the address;
    selecting image data that is stored in a file format corresponding to the capability of the image receiving apparatus;
    extracting the image data of the selected file format from the server.

8. The image data transmitting apparatus according to claim 1, wherein all of the file formats are receivable by a single type of receiving apparatus.

9. The image data transmitting apparatus according to claim 1, wherein converted image data transmitted to the server can be accessed by the recipient by utilizing the transmitted address of the server.

* * * * *